(12) United States Patent
Angelopoulos et al.

(10) Patent No.: US 11,138,805 B2
(45) Date of Patent: Oct. 5, 2021

(54) QUANTITATIVE QUALITY ASSURANCE FOR MIXED REALITY

(71) Applicant: The United States of America, as represented by the Secretary of the Navy, Arlington, VA (US)

(72) Inventors: Christopher James Angelopoulos, Navarre, FL (US); Larry Clay Greunke, Seaside, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/074,585

(22) Filed: Oct. 19, 2020

(65) Prior Publication Data

US 2021/0118234 A1   Apr. 22, 2021

Related U.S. Application Data (60) Provisional application No. 62/923,348, filed on Oct. 18, 2019.

(51) Int. Cl.
| | |
|---|---|
| *G06T 19/00* | (2011.01) |
| *G06T 7/20* | (2017.01) |
| *G02B 27/01* | (2006.01) |
| *G06F 3/01* | (2006.01) |
| *G06T 7/70* | (2017.01) |

(52) U.S. Cl.
CPC ........ *G06T 19/006* (2013.01); *G02B 27/0172* (2013.01); *G06F 3/011* (2013.01); *G06F 3/017* (2013.01); *G06T 7/20* (2013.01); *G06T 7/70* (2017.01)

(58) Field of Classification Search
CPC .......... G06T 19/006; G06T 7/70; G06T 7/20; G02B 27/0172; G06F 3/011; G06F 3/017
See application file for complete search history.

(56) References Cited

U.S. PATENT DOCUMENTS

| | | | |
|---|---|---|---|
| 2013/0155058 A1* | 6/2013 | Golparvar-Fard | ...... G06T 17/00 345/419 |
| 2014/0354529 A1* | 12/2014 | Laughlin | ................ G06F 3/011 345/156 |
| 2016/0307459 A1* | 10/2016 | Chestnut | ................... G06F 3/14 |
| 2018/0350056 A1* | 12/2018 | Cardenas Bernal | .... G06T 7/001 |
| 2019/0096135 A1* | 3/2019 | Dal Mutto | ................ G06T 7/50 |
| 2019/0137979 A1* | 5/2019 | Akella | .................. G06F 11/079 |

* cited by examiner

*Primary Examiner* — Sarah Lhymn
(74) *Attorney, Agent, or Firm* — Naval Postgraduate School; Scott Bell (57) ABSTRACT

The invention relates to quantitative quality assurance in a mixed reality environment. In some embodiments, the invention includes using mixed reality sensors embedded in a mixed reality device to detect body positional movements of a user and using an indirect measuring device to determine a target location for the current state of the target equipment and a current subtask of a predefined workflow. The invention further includes using a direct measuring device associated with the target location to detect a user interaction by the user at the target location, determining a confidence value based on the user movements, the current subtask, and the user interaction, and displaying confirmation of the user interaction on a mixed reality display of the user.

16 Claims, 7 Drawing Sheets

QUANTITATIVE QUALITY ASSURANCE FOR MIXED REALITY

CROSS-REFERENCE TO RELATED APPLICATIONS

This application claims the benefit of U.S. Provisional Application No. 62/923,348, filed Oct. 18, 2019, which is hereby incorporated in its entirety by reference.

BACKGROUND OF THE INVENTION

1. Field of the Invention

The present invention relates generally to methods and systems for quantitative quality assurance in a mixed reality environment.

2. Description of the Related Art

Typically, virtual objects are replicated in mixed reality environments using specifications of the physical objects. Creating mixed reality experiences from computer-aided design (CAD) data, supplied by manufacturers, of physical objects may be correct but is not guaranteed. For example, equipment can be upgraded or modified so that CAD models are no longer accurate. Further, it can be expensive to obtain access to the CAD models in the first place. Another option is to reverse engineer the object; however, reverse engineering can also be quite costly. There are vast amounts of preexisting equipment where no 3D model exists to utilize and poses a barrier for mixed reality implementation. Further, in the cases where CAD models do exist, the models are often not immediately viable for a mixed reality experience—first requiring clean up, decimation, texturing, or other work.

Having cost prohibitive, suspect, or missing models have forced content developers to create mixed reality experiences with workflows relying on tool chains geared towards reverse engineering. Some workflows model via 3D scanning equipment creating point clouds where surfaces can be derived through algorithms; however, this is laborious and requires further contextual manipulation to be usable. Other workflows capture discrete points with a portable coordinate measuring machine.

The virtual objects can be used to guide a user through a workflow in the mixed reality environment; however, regardless of instructional delivery method (e.g., memory, book, computer screen, mixed reality experience, etc.), it can be difficult to objectivity assure that the human activity is performed according to the workflow. Most processes for quality assurance are management centric and inject significant human decisions into the process. Inspections of activity, audits of the inspection, sampling, random lot sampling are but a few. Every subjective act, like a signature that attests to the correctness or completeness of a task, adds risk (lost resources). Some companies are exploring techniques that record a person during the process (both with traditional cameras as well as spatial position) or take photographs at key points, but currently these are reviewed by humans for quality assurance and are therefore subjective or they are used for training purposes (expert showing a novice).

Some device designs attempt to incorporate connectivity to enhance the user's experience. For example, an electronically connected torque wrench can send torque values through the connection. However, there is no real time feedback, connectivity to procedure or dynamic adjustments (e.g., whether the tool calibrated and set to the proper setting for that particular activity), archival with location data, or human performance metrics that can make this process more objective.

Internet of things (IoT) sensing can be used to determine device states (e.g., temperature, pressure, connectivity, etc.), which is a good source of objective measure. However, the sensing does not focus on the granularity of the, for example, repair/assembly procedure. Some procedures can look and operate correctly according to IoT sensoring while being constructed incorrectly (wrong width washer, wrong strength bolt—early fail states).

Factory quality assurance can employ automated techniques that are objective. For example, a laser sensor (or computer vision) that determines the size of a widget can reject one that is not the correct size. However, such sensors currently do not evaluate human actions as part of a quality assurance program.

SUMMARY OF THE INVENTION

Embodiments in accordance with the invention relate to a method and system for quantitative quality assurance in a mixed reality environment. In some embodiments, the method includes using mixed reality sensors embedded in a mixed reality device to detect body positional movements of a user and using an indirect measuring device to determine a target location for the current state of the target equipment and a current subtask of a predefined workflow. The invention further includes using a direct measuring device associated with the target location to detect a user interaction by the user at the target location, determining a confidence value based on the user movements, the current subtask, and the user interaction, and displaying confirmation of the user interaction on a mixed reality display of the user.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a creation authoring point tool utility.

Viable mixed reality experiences, where the matching digital domain can be spatially and contextually overlaid within the real world, require known precise positional and dimensional information about objects in the physical environment. Acquiring the digitization of physical objects attributes (e.g., height, width, length) is the first challenge.

Context should also be added to these models so that the user can be guided within the mixed reality environment. Once a 3D model exists, in any form, content producers adapt them (e.g., decimate, add context) to provide a key element within mixed reality experiences. These digitized objects along with their context enable operations like step by step instructions for fixing maintenance of an item or detailing physical object placement within a space.

As operating environments become more complex, the need for objective measures of performance become critically important. Historically, quality assurance of human centric manual production relies on indirect human observation or process driven assurance programs. The subjective nature of quality assurance processes poses significant risk when repair, assembly, or human monitoring are required. A completed assembly or repair that works does not necessarily mean the process was complied with at an acceptable adherence to specification. Traditionally layered human inspection provides a second or third look to ensure the work meets specification. The subjectivity of the traditional process, in general, inserts uncertainty into any process that can transfer into the resulting quality assurance. Subjective quality assurance measures can eventually, and potentially spectacularly, fail to spotlight substandard performance.

Embodiments described herein relate to performing quantitative quality assurance in a mixed reality environment. In the embodiments, subtasks can be associated with human performance bounding, expected actions can be defined, and sensors can be used to add objectivity to metrics. Real time evaluation of indirect and direct measures can include machine learning for observing human performance where no credible performance metrics exist. Immediate feedback based on these metrics can be provided to the user. All appropriate human performance data, object recognitions, task data, etc. can be archived for both task quality assurance and for evaluating human performance. For example, this performance data can be used to perform targeted training or to evaluate performance for excellence awarding.

Figure 1A:
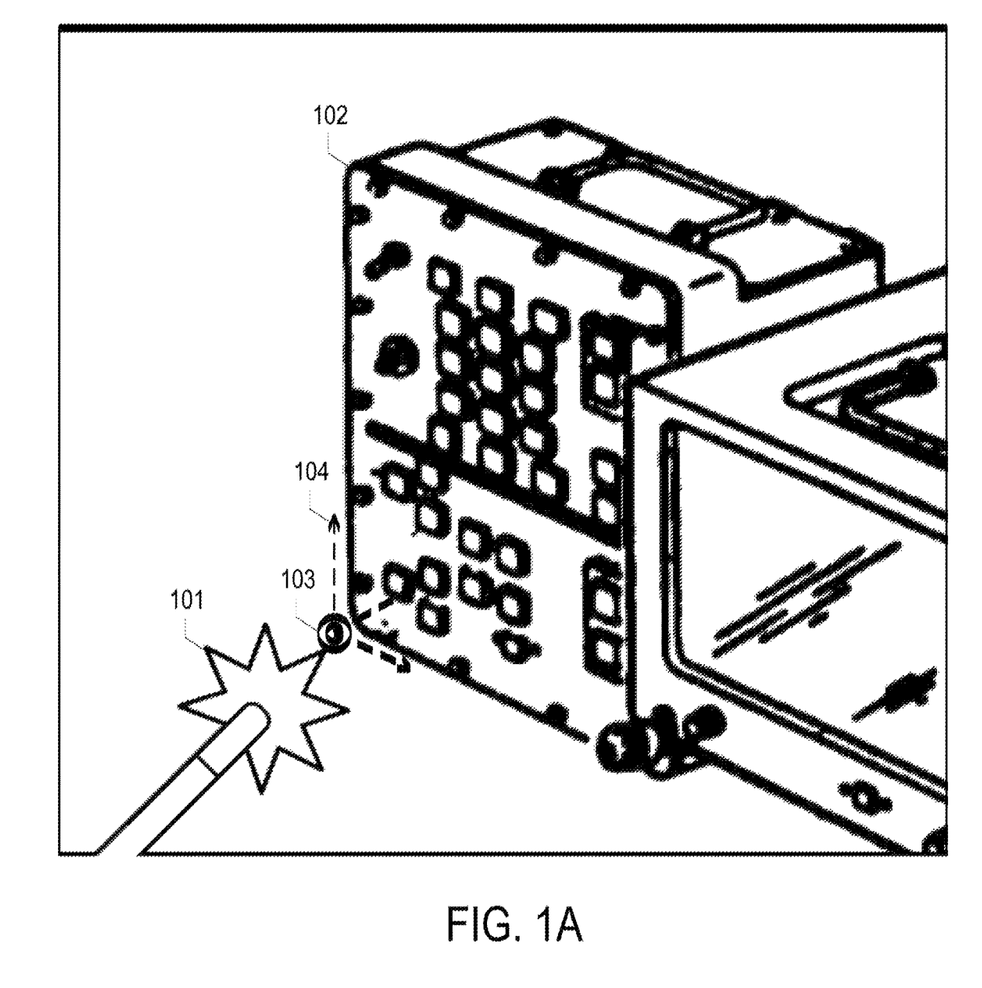
FIGS. 1A-1C illustrate positional data collection for a creation authoring point tool utility.
Figure 1B:
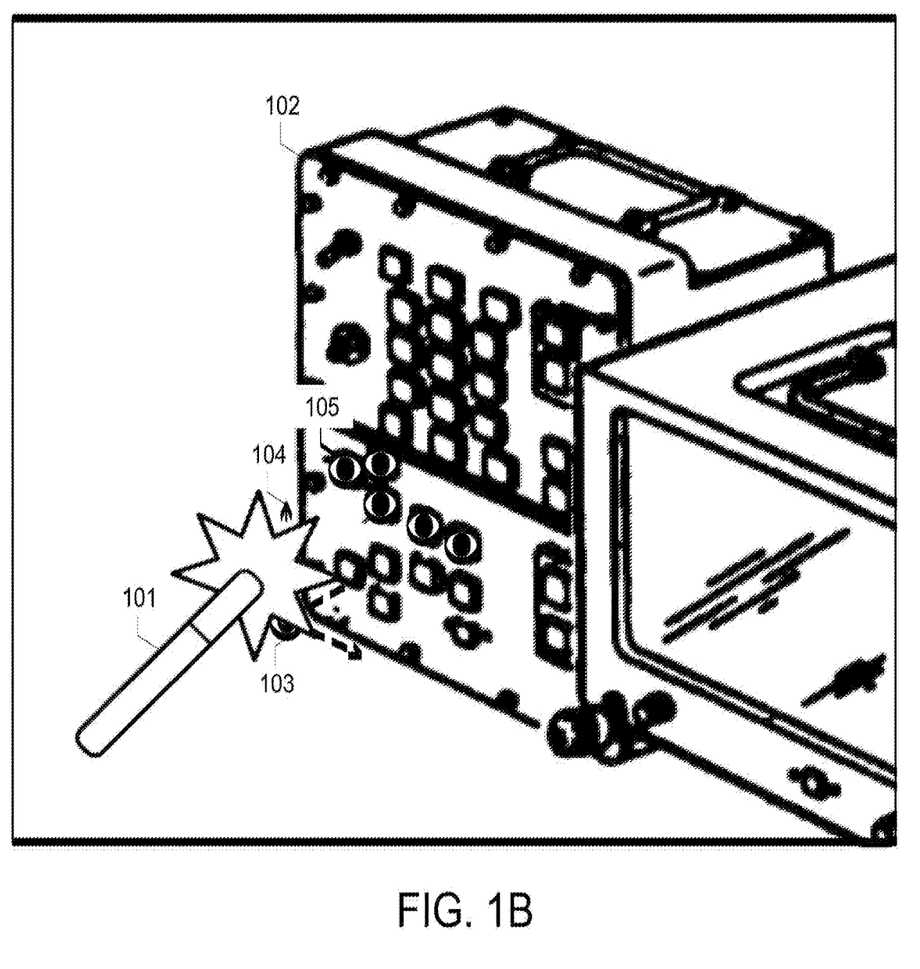
Figure 1C:
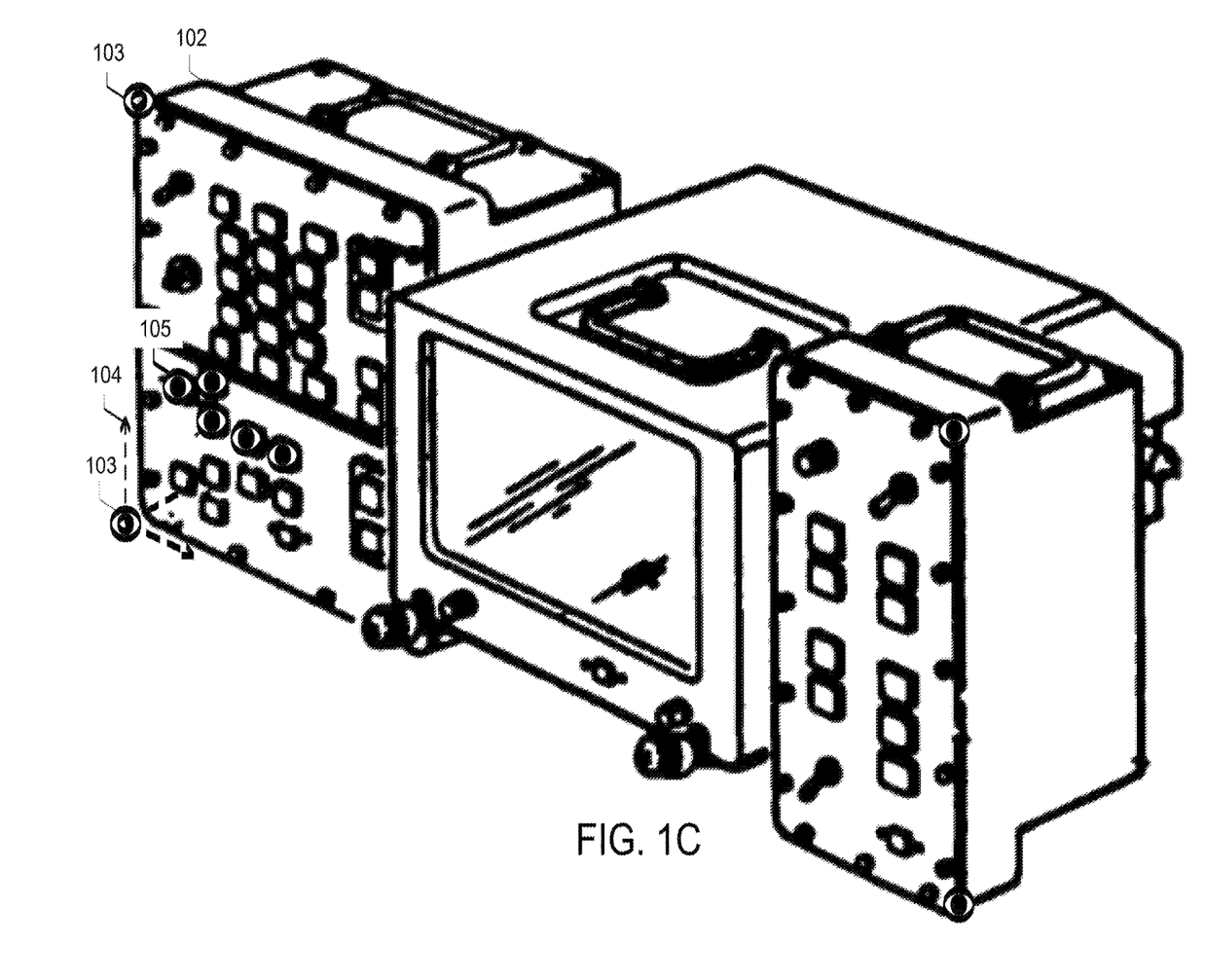

FIGS. 1A-1C illustrate a procedure for collecting positional data for a creation authoring point tool utility. Specifically, each of FIGS. 1A-1C shows the data collection at different stages as it is being used to generate a 3D model of a physical object, for use within a mixed reality environment. Various embodiments may not include all the steps described below, may include additional steps, and may sequence the steps differently. Accordingly, the specific arrangement of steps described with respect to FIGS. 1A-1C should not be construed as limiting the scope of the creation authoring point tool utility.

FIG. 1A shows a mixed reality controller 101 that is being wielded by a user (not shown) to define a coordinate system frame of reference 103, 104 for a physical object 102. The mixed reality controller 101 is being used to position the coordinate system frame of reference 103, 104 on a corner of the physical object 102. The coordinate system frame of reference 103, 104 includes an initial object point 103 and three-dimensional directional axes 104. After the mixed reality controller 102 is used to position the initial object point 103, the direction of the three dimensional directional axes 104 can be modified to be in sync with the geometry of the physical object (e.g., aligned with the corner of a box-like physical object 102. The coordinate system frame of reference 103, 104 may be used as a reference point for any additional points specified by the mixed reality controller 101.

FIG. 1B shows the mixed reality controller 101 being used to define an interface element 105 in the mixed reality environment. Specifically, the user uses the mixed reality controller 101 to position the interface element 105 over a corresponding physical interface of the physical object 102. In this example, the user has defined five interface elements 105 that correspond to physical buttons on the physical object 102. Those skilled in the art will appreciate that the mixed reality controller 101 could be used to define any number of interface elements of various interface types (e.g., buttons, levers, switches, dials, etc.). As each interface element 105 is defined, its position is determined with respect to the coordinate system frame of reference 103, 104.

FIG. 1C shows point data specified by the user for a physical object 102. The point data for the physical object 102 includes four object points 103, one of which is a part of the coordinate system frame of reference 103, 104, and five interface elements 105. Once submitted by the user, the point data can be processed to generate a 3D model (not shown) of the physical object 102. The 3D model can then be used to collect metadata and generate a workflow as described below.

Figure 2:
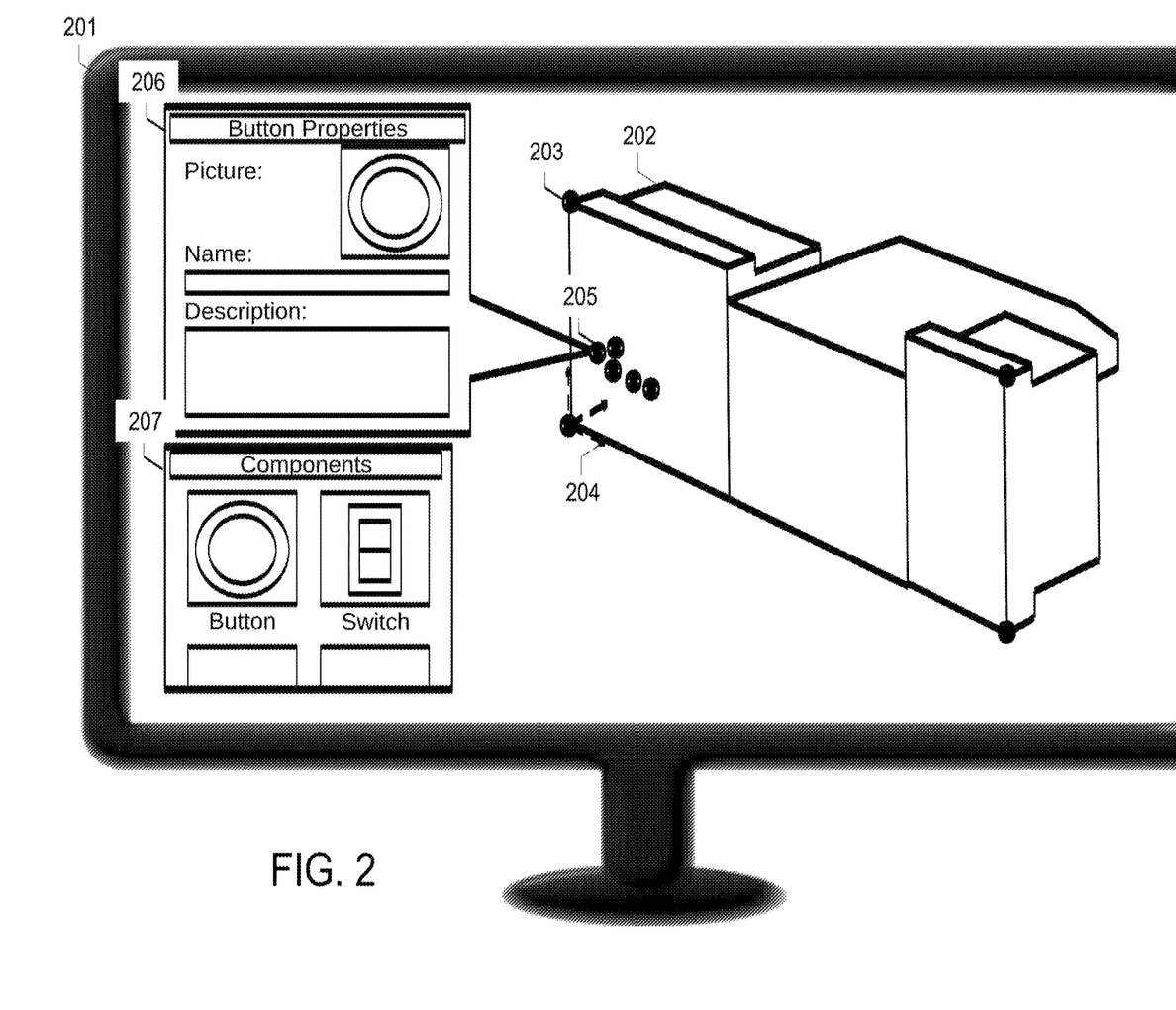
FIG. 2 shows an editor for collecting metadata for a creation authoring point tool utility.

FIG. 2 illustrates an editor 201 for collecting metadata for a creation authoring point tool utility. The editor 201 shows a 3D model 202 of a physical object that includes positional data 203, 204, 205 collected, for example, as described above with respect to FIGS. 1A-1C. The editor 201 allows a user to review the positional data for accuracy and to specify metadata for individual positional points in the 3D model 202.

When the user selects an interface element 205, an interface properties window 206 is displayed. The interface properties window 206 allows the user to specify metadata such as a picture, a name, a description, workflow information, etc. In this manner, the user may select each interface element 205 and specify the corresponding metadata in the interface properties window 206. In some cases, the metadata allows the interface element 205 to be used in workflows that describe how to operate the physical object in a mixed reality environment.

The editor 201 also includes a component type window 207 that allows the user to select the type of each interface element 205. In the example, the user can drag a component type from the window 207 and drop the selected type to a corresponding interface element 205 to set the interface type of the element 205.

The editor 201 can also allow the user to reposition object points 203, three dimensional directional axes 204, and interface elements 205. In this example, the user can reposition the positional data 203, 204, 205 by simply dragging it to a different location. The editor 201 can also allow the user to define workflows with the interface metadata.

In FIG. 2, the editor 201 is implemented as a standard user interface of a user computing device (e.g., laptop computer, desktop computer, tablet computer, etc.). In other embodiments, the editor could be implemented as a virtual interface of a virtual reality computing device. In these other embodiments, the user can interact with the 3D model 202 in a virtual environment interface that is similar to the editor 201.

Figure 3:
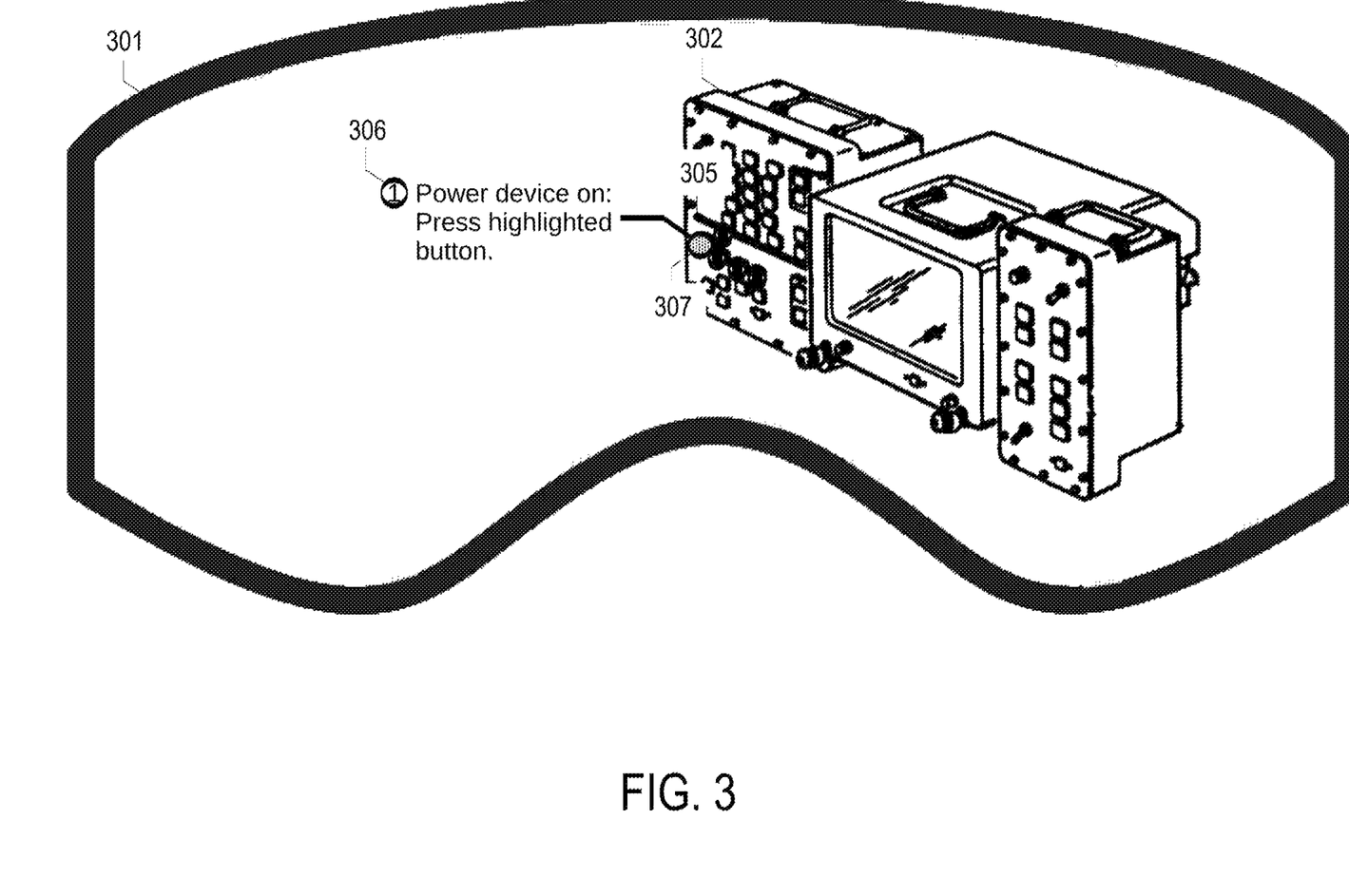
FIG. 3 shows a mixed reality environment as view through a virtual reality headset display.

FIG. 3 shows a mixed reality environment as view through a virtual reality headset display 301. In the display 301, the actual physical object 302 is overlaid with virtual representation of interface elements 305, workflow information 306, and a highlighted element 307. In a mixed reality environment, the overlaid virtual representation follows the physical object 302 as the user changes his view.

The workflow information 306 can described an operation that the user should perform using the highlighted element 307.

The user can also use a mixed reality controller (not shown) to navigate through a wizard of the workflow. When the user completes a step of the workflow, he can use the controller to proceed to the next step in the workflow, where the workflow information 306 and highlighted element 307 are updated to provide instructions for the next interface element used in the next step. In this manner, the user can perform each step in the workflow until the workflow is completed. Because the 3D model of the physical object 302 is defined in reference to coordinate system frame of reference that is tied to a position on the physical object 302, the use can be guided through the workflow regardless of the actual location of the physical object 302 (i.e., the workflow guide still operates if the location of the physical object 302 is changed).

Figure 4:
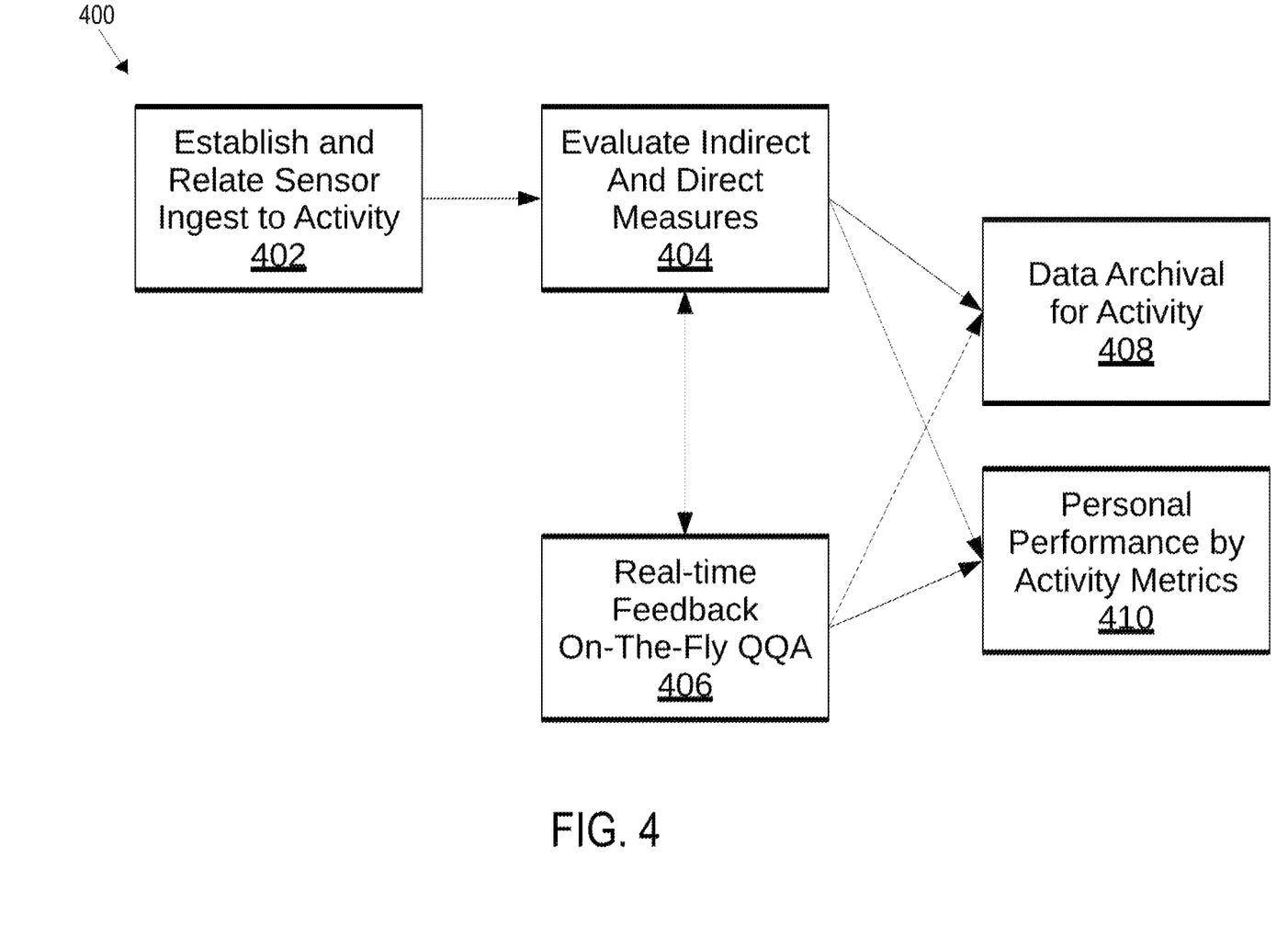
FIG. 4 shows a workflow for quantitative quality assurance in a mixed reality environment.

FIG. 4 shows a flowchart 400 for quantitative quality assurance in a mixed reality environment. As is the case with this and other flowcharts described herein, various embodiments may not include all of the steps described below, may include additional steps, and may sequence the steps differently. Accordingly, the specific arrangement of steps shown in FIG. 4 should not be construed as limiting the scope of quantitative quality assurance.

In block 402, sensor ingest is established and related to subtasks of a workflow. The workflow may include a number of subtasks that a user should perform in a mixed reality environment. Expected actions and performance bounds can be defined for each subtask, where sensor ingests can then be related to the performance bounds of each subtask. For example, a performance bound of a subtask can be the amount of time required for a user to complete the subtask, and the sensor ingest can be defined as the elapsed time until motion sensors in a virtual reality controller determine that the subtask is completed.

In block 404, indirect and direct measures of sensors are evaluated while the user is performing the workflow. As the user is performing subtasks, the virtual environment is aware of the state of the procedure (i.e., what subtask is currently being performed) and relevant movements by the user are being recorded and logged. These movements can be recorded by sensors as indirect and/or direct measures.

Indirect measures are sensoring, metrics, and algorithms that feed both real time and archival quality assurance. For example during an assembly task, indirect measures can include the location of the user's hands, detecting whether the proper hand physical action matches the expected action (e.g., modern phones can detect a 'shake' gesture vs. 'rotation' same logic could be to detect a turning action vs. pulling action with hand), and visual dwell time and focal distance, which can be used as a metric to understand completeness of an assembly task. In this example, an individual looking past an object cannot be inspecting that object for the purposes of completing an action in the workflow. In another example during a repair task, indirect measures can include computer vision that recognizes the new subcomponent, old subcomponent, and the process of removal and replacement. The computer vision of the repair task can be performed regardless of human visual activity (objectively evaluating and documenting actions) or as a comparison to what the human is visually observing (e.g., 1) Why is the user focusing outside the expected work area? 2) Focal distance and sight line in expected parameters far expected dwell time, 3) User cannot monitor work visually due to obstruction). For this example, computer vision of imagery taken from a camera sensor can also process user's hand position. The user's hand position can be relevant to determine whether the subtask is performed correctly by the user. The headset (or sensor) can collect measures related to the location of the subcomponents, the user, the user's hand position, and the current step of the procedure, which are then used to determine an objective confidence score for the current subtask.

Direct measures incorporate feedback from the object or system where actions of the workflow are being performed. For example, a test bench can have a sensor to detect that a connection has been made with a wire. Other examples of direct measures include detectors or sensors for network connectivity, temperature, pressure, voltage, etc. In another example for network connectivity, the connector itself can be the sensor validator (i.e., the act of the connection with the connector becomes the validation).

In block 406, real-time feedback of quantitative quality assurance is provided to the user. For example, after the user completes a subtask in the workflow, a confidence score can be displayed for the user to show how well (e.g., compliance, speed, accuracy, etc.) the user performed. The confidence score can be determined based on the indirect and direct measures as described above in block 404.

In block 408, data metrics for the subtask's performance are archived. For example, the indirect and direct measurements along with the resulting confidence value can be stored in a database. These data metrics can be used to, for example, gauge the effectiveness of training, develop modifications to the workflow, etc.

In block 410, the personal performance of the user can be determined by the data metrics. For example, a report can be generated for the user that shows the confidence value for each subtask along with an overall grade to assess the completion of the workflow. Tracking the personal performance of the user can be used to build a personal profile that encourages the user to improve his performance in completing the workflow, assess the job performance of the user, etc.

Figure 5:
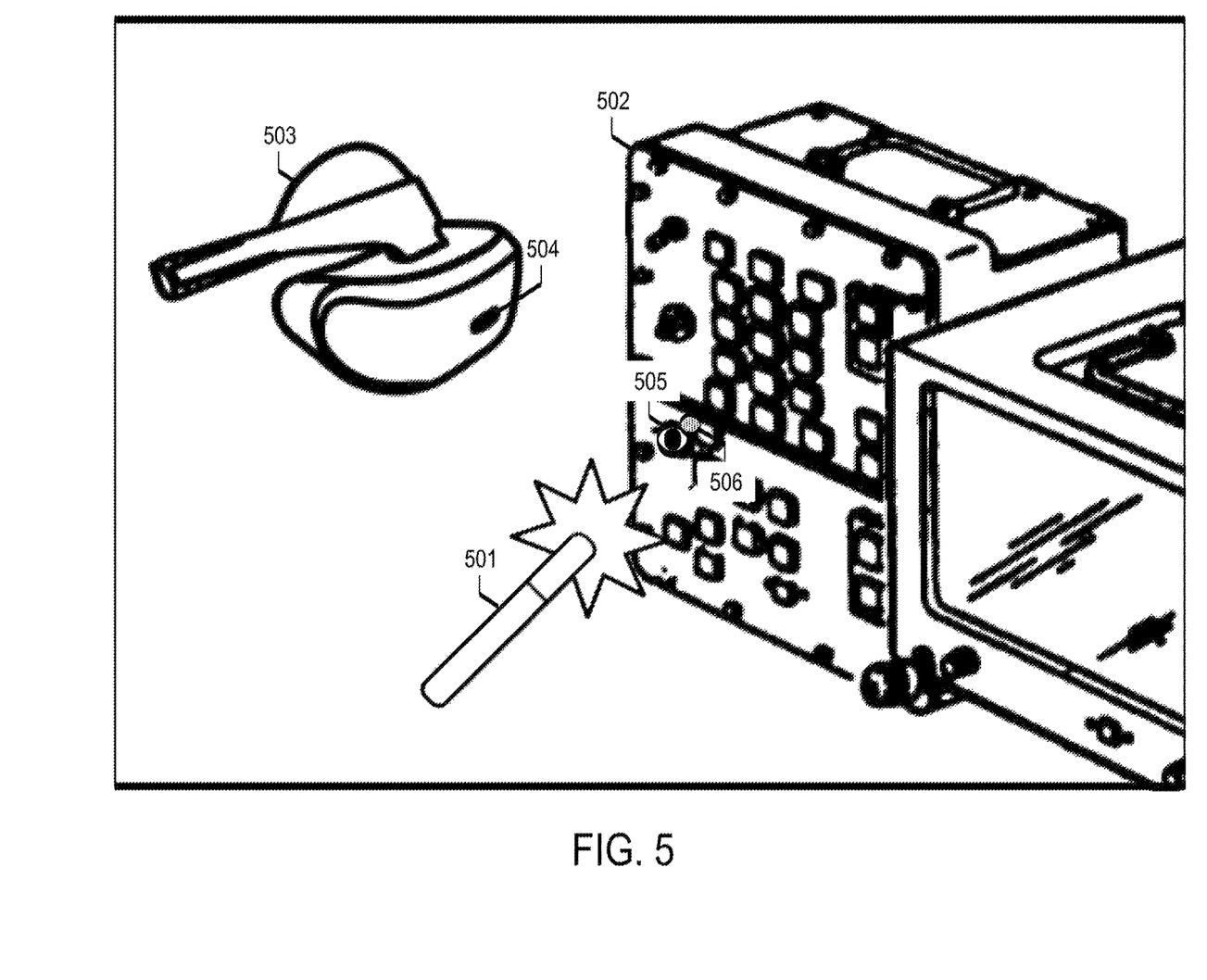
FIG. 5 illustrates quantitative quality assurance being performed in a mixed reality environment.

FIG. 5 illustrates quantitative quality assurance being performed in a mixed reality environment. A user's virtual headset 503 and virtual controller 501 are shown interacting with a piece of equipment 502. The user is working on a current subtask that involves a physical interface that is highlighted 505 in the mixed reality environment. As the user completes the current subtask, indirect and direct measurements are collected by the headset (camera/sensor set information—indirect: pose, hand position/movement relative to the user and workspace/object, user location relative to workspace/object, etc. vs. direct: computer vision identification of correct parts for example), 504 and the virtual controller 501, and direct measurements are collected by an interface sensor 506. The interface sensor 506 detects when the user interacts (e.g., flips a switch, pushes a button, completes a connection, etc.) with the physical interface, which is interpreted in the mixed reality environment as completion of the subtask. When the subtask is completed, the collected indirect and direct measurements can be used to determine a confidence value, which can be presented to the user on the virtual headset 503.

The invention may be implemented on virtually any type of computer regardless of the platform being used. For example, a computer system can include a processor, associated memory, a storage device, and numerous other elements and functionalities typical of today's computers. The computer may also include input means, such as mixed reality controllers or a keyboard and a mouse, and output means, such as a display or monitor. The computer system may be connected to a local area network (LAN) or a wide area network (e.g., the Internet) via a network interface connection. Those skilled in the art will appreciate that these input and output means may take other forms.

Further, those skilled in the art will appreciate that one or more elements of the computer system may be located at a remote location and connected to the other elements over a network. Further, the invention may be implemented on a distributed system having several nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and or resources. Further, software instructions to perform embodiments of the invention may be stored on a computer readable medium such as a compact disc (CD), a diskette, a tape, a file, or any other computer readable storage device.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method for performing quality assurance in a mixed reality environment, the method comprising:
    using mixed reality sensors embedded in a mixed reality device to detect body positional movements of the user;
    using an indirect measuring device to determine:
        a target location for the current state of the target equipment; and
        a current subtask of a predefined workflow;
    using a direct measuring device associated with the target location to detect a user interaction by the user at the target location;
    determining a confidence value based on the user movements, the current subtask, and the user interaction; and
    displaying confirmation of the user interaction on a mixed reality display of the user.

2. The method of claim 1, wherein the indirect measuring device is a headset camera and sensor set.

3. The method of claim 2, further comprising:
    during the current subtask of the predefined workflow, using the headset camera and sensor set to determine a visual dwell time of the user on the target location, wherein the confidence value is also determined based on the visual dwell time.

4. The method of claim 3, further comprising displaying the confidence value on the mixed reality display of the user.

5. The method of claim 2, further comprising:
    during the current subtask of the predefined workflow, using the headset camera and sensor set to determine a focal point of the user, wherein the confidence value is also determined based on the focal point.

6. The method of claim 5, wherein determining the confidence value further comprises determining how closely the focal point matches a historical focal point.

7. The method of claim 1, wherein the direct measuring device is a connection detector, and wherein the user interaction is physically connecting a cable to the connection detector.

8. The method of claim 1, wherein the direct measuring device is a wireless device, and wherein the user interaction is wirelessly initiating a connection to the wireless device.

9. A non-transitory computer-readable medium comprising executable instructions for causing a computer processor to:
    use mixed reality sensors in a mixed reality device to detect body positional movements of a user;
    use an indirect measuring device to determine:
        a target location for the current state of the target equipment; and
        a current subtask of a predefined workflow;
    use a direct measuring device associated with the target location to detect a user interaction by the user at the target location;
    determine a confidence value based on the user movements, the current subtask, and the user interaction; and
    display confirmation of the user interaction on a mixed reality display of the user.

10. The non-transitory computer-readable medium of claim 9, wherein the indirect measuring device is a headset camera and sensor set.

11. The non-transitory computer-readable medium of claim 10, wherein the executable instructions further cause the computer processor to:
    during the current subtask of the predefined workflow, use the headset camera and sensor set to determine a visual dwell time of the user on the target location, wherein the confidence value is also determined based on the visual dwell time.

12. The non-transitory computer-readable medium of claim 11, wherein the executable instructions further cause the computer processor to display the confidence value on the mixed reality display of the user.

13. The non-transitory computer-readable medium of claim 10, wherein the executable instructions further cause the computer processor to:
    during the current subtask of the, predefined workflow, use the headset camera and sensor set to determine a focal point of the user, wherein the confidence value is also determined based on the focal point.

14. The non-transitory computer-readable medium of claim 13, wherein determining the confidence value further comprises determining how closely the focal point matches a historical focal point.

15. The non-transitory computer-readable medium of claim 9, wherein the direct measuring device is a connection detector, and wherein the user interaction is physically connecting a cable to the connection detector.

16. The non-transitory computer-readable medium of claim 9, wherein the direct measuring device is a wireless device, and wherein the user interaction is wirelessly initiating a connection to the wireless device.

* * * * *